United States Patent [19]

Monier

[11] Patent Number: 4,662,940

[45] Date of Patent: May 5, 1987

[54] SEALANT COMPOSITION AND LEAK DETECTOR FOR AUTOMOBILE COOLING SYSTEMS AND THE LIKE

[75] Inventor: John L. Monier, Oxford, Mich.

[73] Assignee: Tri-X Corporation, Oxford, Mich.

[21] Appl. No.: 724,520

[22] Filed: Apr. 18, 1985

Related U.S. Application Data

[63] Continuation of Ser. No. 582,371, Feb. 22, 1984, abandoned.

[51] Int. Cl.⁴ .............................................. C09K 3/10
[52] U.S. Cl. ...................................................... 106/33
[58] Field of Search ...................... 106/33; 252/68, 72, 252/73, 77, 71, 79, 301.19

[56] References Cited

U.S. PATENT DOCUMENTS

| | | | |
|---|---|---|---|
| 3,322,548 | 5/1967 | Lasswell et al. | 106/33 |
| 3,770,640 | 11/1973 | Bartlett | 252/68 |
| 4,249,412 | 2/1981 | Townsend | 252/301.19 |
| 4,348,235 | 9/1982 | Lasswell et al. | 106/33 |

FOREIGN PATENT DOCUMENTS 0149366  11/1980  Japan ............................. 252/301.19

Primary Examiner—Theodore Morris
Attorney, Agent, or Firm—Hauke & Patalidis

[57] ABSTRACT

A stop-leak sealant composition for an internal combustion engine cooling system, hot water heating systems and the like consisting essentially of ginger rhizome flour, ground nut shells, boric acid, with or without additives to improve performance and more particularly with a fluorescent water-soluble leak detectng additive to detect leaks that cannot be stopped by the sealant composition.

18 Claims, No Drawings

SEALANT COMPOSITION AND LEAK DETECTOR FOR AUTOMOBILE COOLING SYSTEMS AND THE LIKE

This is a continuation of application Ser. No. 582,371, filed Feb. 22, 1984, now abandoned.

BACKGROUND OF THE INVENTION

The invention relates in general to a stop-leak or sealant composition and, more particularly, the invention relates to a sealant composition particularly adapted for use in the cooling systems of internal combustion engines and in hot water heating systems, although not necessarily limited thereto, which comprises leak detector additives to detect leaks that cannot be stopped by the sealant.

Stop-leak sealant compositions found in the prior art generally consist essentially of a starchy paste such as corn starch, cereal flours and the like, mixed with a powdered metal, such as aluminum, or with powdered graphite. Some compositions also contain rosins or gums, and may include in addition a small quantity of soluble oil or soap.

Such compositions function on the theory of forming a film or coating over the leaks in, for example, internal combustion engine cooling systems. Such a film or coating is generally not of a permanent nature, so that the leak may reappear after a short time, with the result that repeated treatments of the cooling system are required. Other compositions containing a soluble oil or soap have a tendency to coat the surfaces exposed to the flow of coolant or heating fluid with an oily film, so that the sealant ingredients in the composition are somewhat prevented from strongly adhering to the surfaces proximate a leak, and the oil film thus formed is detrimental to proper heat transfer between the cooling system internal surfaces and the coolant fluid circulating through the cooling system.

In U.S. Pat. No. 4,348,235, issued Sept. 7, 1982 and assigned to the same assignee as the present application, which is an improvement on prior U.S. Pat. No. 3,322,548, there is disclosed an improved stop-leak or sealant composition which avoids most of the shortcomings of prior art sealant compositions, and which further acts as an efficient rust preventer without the addition of any oil or soap to the composition, which provides a permanent seal for most holes or cracks in a cooling or heating system, which is compatible with all known types of anti-freeze compositions and which dissolves rapidly in a liquid fluid such as water and provides an improved dispersion and suspension of the ingredients in the coolant of an internal combustion engine or in the heat transferring fluid of a heating system.

SUMMARY OF THE INVENTION

The objects of the present invention are also to provide improved novel stop-leak or sealant compositions, more particularly for internal combustion engine cooling systems, but also for hot water heating systems or any system utilizing a liquid fluid, such as water, circulating in a closed loop circuit, which produce a permanent seal, which inhibit the formation of rust and corrosion within a cooling or heating system, and which provide appropriate lubrication for circulation pumps, without any of the inconveniences resulting from the use of an oily stop-leak compositions.

Further objects of the invention are to provide an improved stop-leak or sealant composition which does not deteriorate with time, which has no deleterious action on metal or rubber, which is compatible with all known anti-freeze solutions, which is available in a dry form such as a small size pill or pellet capable of treating a substantial volume of coolant or heating fluid, which does not clog restricted passages in a cooling or heating system, which dissolves almost immediately in cold as well as hot water, which is capable of sealing substantially large cracks or holes, which does not form any sludge in a cooling or heating system, which may be readily prepared from ingredients readily obtainable on the market, and, more particularly and in addition, which acts as a leak detector for the leaks that cannot be sealed by the sealant composition, such as vibration leaks, large cracks, head gasket leaks, and the like.

Further objects and advantages of the invention will become apparent when the following descriptions of preferred embodiments, which are given for illustrative purposes only, are considered together with the method of preparing the same and the claims appended hereto.

DETAILED DESCRIPTION OF THE PREFERRED EMBODIMENTS

In the preparation of a stop-leak or sealant composition according to the invention, hardwood nut shells, such as almond shells, pecan shells and the like, are finely ground in a hammermill until the nut shell powder thus obtained is capable of passing through a No. 30 mesh screen. Ginger rhizomes are also ground in a separate hammermill until the resulting ginger rhizome flour is capable of passing through a No. 30 mesh screen.

The ground hardwood shell powder and the ginger rhizome flour are then mixed, or blended, in a ribbon mixer for approximately five minutes. About 20 to 50% by weight of ground hardwood nut shell powder is mixed to 50 to 75% by weight of ginger rhizome flour.

To the mixture of ground and screened hardwood nut shell powder and ginger rhizome flour are added binder and lubricant agents consisting of boric acid powder, about 1.5 to 3.5% by weight, magnesium stearate, about 0.5 to 2% by weight, Orzan S, about 3 to 6% by weight, and 2 to 12% of a leak detector additive, and the blend is thoroughly mixed for another 2 to 3 minutes. Orzan S is a trademark of Crown Zellerbach, Chemical Products Division, Camas, Wash. 98607. It is available in the form of a free-flowing, light brown spray-dried powder and is essentially sodium lignin sulfonate containing traces of wood sugars.

The mixture of ingredients is then fed to a continuously rotating pellet making machine in which the ingredients are compacted in individual pellets under a pressure of at least 2 tons per square inch (140 kg/cm$^2$) and preferbly between 20 tons per square inch (1,400 kg/cm$^2$) and 40 tons per square inch (2,800 kg/cm$^2$).

The finished product, in the form of a pellet, substantially 25 mm. in diameter by 15 mm. in height, and weighing substantially from nine to ten grams, has been found sufficient for treating 12 to 16 liters of coolant or heat transfer fluid. Consequently, one such pellet is sufficient for the engine cooling system of a compact automboile, while two pellets or pills are preferably used in the engine cooling system of large size, formerly so-called standard-sized, automobiles.

The Orzan S, the boric acid and the magnesium stearate together provide an effective binder for the pulverized ingredient mixed powders after compacting in the form of a dried pellet. The magnesium stearate, in addition, contributes to facilitating mold release and promoting good flow characteristics to the powders with which it is mixed, even though such powders may be somewhat hygroscopic. The boric acid, in addition to also forming an effective binder, acts as a dry lubricant for the compacting punches and dies and helps in eliminating formation of rust and corrosion in internal combustion engine cooling systems and in hot water heating systems. The action of the Orzan S ingredient is that of a strong binding agent for the powder particles which also contributes to lubrication of the punches and dies, minimizes dusting or breakage of the compacted pellets, and improves the flow properties of the finely divided solid particles in suspension in the coolant or heating fluid in view of the characteristics of Orzan S as a dispersant or surface active agent.

The leak detector additive is selected from a variety of water-soluble fluorescent materials such as available from diverse suppliers and generally designed as water-soluble pearlescent nacreous pigments, fluorescent dyes and optical brighteners.

The leak detector fluorescent additive permits to detect leaks too large to be sealed by the sealant or leaks which, although stopped by the sealant, are still too large to remain sealed when continuously subjected to vibrations with the result that such leaks often reopen during use of the equipment such as could be the case for the cooling system of an internal combustion engine. Such leaks often remain undetected because the coolant leaking to the ambient rapidly evaporates without leaving any trace, and the leaks generally occur while the equipment is functioning and they may stop when the equipment is not in service. By use of the sealant of the invention provided with a leak detector additive, the leaks which cannot be sealed by the sealant can be detected by observation under ultraviolet light illumination, preferably under long wave ultraviolet light illumination or so-called "black light", in a dimly-lit enclosure.

Among the ingredients suitable as a water-soluble fluorescent additive in the sealant and leak detector composition of the invention the following ingredients are particularly suitable:

Water-soluble pearlescent nacreous pigments, sold under the trademark MEARLIN PEARLWHITE by the Mearl Corporation, 41 East 42nd Street, New York, N.Y. 10017;

Water-soluble fluorescent dyes sold under the trademark PYLAKLOR by Pylam Products Company, Inc., 1001 Stewart Avenue, Garden City, N.Y. 11530, more particularly, PYLAKLOR LX-1152 and S-553; and Water-soluble fluorescent dyes and optical brighteners sold under the marks UVITEX OB and TINOPAL CBS-X by Ciba-Geigy Corporation, P.O. Box 18300, Greensboro, N.C. 27419.

Examples of water-soluble fluorescent compounds suitable for the invention, some of which may be included alone or in mixture in commercially available fluorescent dyes and optical brighteners are: 2,2'-(2,5 Thiophenediyl)Bis(5-Tert-butylbenzohaxazole); Diamino-stilbenedisulfonic acid; Cyanuric chloride; Naphto-triazolylstilbene; 4-Methyl-7-dimethylamino coumarin; 4-Methyl-7-diethylamino coumarin; Benzoflavine; 3,6-Dioxyphthalimide; Erythrosine; Esculin; 4-Ethoxyacridone; 3,6-Tetramethyldiaminooxanthone; Chromotropic acid; Fluorescein; α-Naphthylamine; β-Naphthylamine; Phloxine; Salicylic acid; Acridine; Dichlorofluorescein; 3,6-Dioxyxanthone; β-Methylesculetin; Resorufin; and Quininic acid.

The range of ingredients, in percent by weight, which has been found suitable for the sealant and leak detector composition according to the present invention is tabulated in the following table:

TABLE

| | |
|---|---|
| Water-soluble fluorescent additive | 2–12 |
| Ginger rhizome flour | 50–75 |
| Orzan S | 3–6 |
| Boric acid | 1.5–3.5 |
| Magnesium stearate | 0–2 |
| Ground nut shells | Balance |

Specific examples of stop-leak compositions within the scope of the present invention are given hereinafter:

EXAMPLE 1

| | |
|---|---|
| Fluorescent additive | 2% by weight |
| Ginger rhizome flour | 70% by weight |
| Ground nut shells | 22% by weight |
| Orzan S | 3% by weight |
| Boric acid | 2% by weight |
| Magnesium stearate | 1% by weight |
| | 100 |

EXAMPLE 2

| | |
|---|---|
| Fluorescent additive | 5% by weight |
| Ginger rhizome flour | 65% by weight |
| Ground nut shells | 24% by weight |
| Orzan S | 3% by weight |
| Boric acid | 2.5% by weight |
| Magnesium stearate | 0.5% by weight |
| | 100 |

EXAMPLE 3

| | |
|---|---|
| Fluorescent additive | 8% by weight |
| Ginger rhizome flour | 52% by weight |
| Ground nut shells | 30% by weight |
| Orzan S | 5% by weight |
| Boric acid | 2% by weight |
| Magnesium stearate | 2% by weight |
| | 100 |

EXAMPLE 4

| | |
|---|---|
| Fluorescent additive | 11% by weight |
| Ginger rhizome flour | 52% by weight |
| Ground nut shells | 29% by weight |
| Orzan S | 4.5% by weight |
| Boric acid | 2.5% by weight |
| Magnesium stearate | 1% by weight |
| | 100 |

EXAMPLE 5

| | |
|---|---|
| Fluorescent additive | 4% by weight |
| Ginger rhizome flour | 65% by weight |
| Ground nut shells | 25% by weight |
| Orzan S | 4% by weight |
| Boric acid | 2% by weight |

-continued

| | |
|---|---|
| | 100 |

EXAMPLE 6

| | |
|---|---|
| Fluorescent additive | 12% by weight |
| Ginger rhizome flour | 52% by weight |
| Found nut shells | 29% by weight |
| Orzan S | 4% by weight |
| Boric acid | 3% by weight |
| | 100 |

Example 2 and Example 4 are preferred average compositions for universal use in internal combustion engine cooling systems, as providing best over-all combined leakage prevention, water pump lubrication and rust inhibition characteristics under the normal conditions encountered in such systems. Example 4 provides best leak detection characteristics. Example 3 provides a hard pellet highly resistant to dusting and breakage and having high corrosion inhibition and scouring properties with good leak detection properties, while Example 1 provides best long-term leakage prevention and healing characteristics with immediate good leak detection properties somewhat decreasing with the passage of time.

The Examples 1 through 4 are preferred compositions, as containing magnesium stearate, for pressing into dry pellets, although they can also be used in bulk powder, while Example 5 and Example 6, omitting magnesium stearate, are preferred compositions for use as bulk powder. All the examples contain a small amount of boric acid which, in addition to acting as a good binder when the ingredients are compacted into dry pellets, helps eliminating the formation of rust and corrosion in internal combustion cooling systems and in hot water heating systems, and acts as a lubricant for water pumps that may form part of the systems.

Stop-leak sealant and leak detector compositions according to the invention, in the form of pellets as well as in the form of bulk powder, have been found to be an effective cooling or heating system sealant capable of sealing not only tiny pin holes and narrow cracks but also holes as large as 0.8 mm and more. The mixture of ingredients penetrates inside the hole or crack and rapidly turns into a plastic-like permanent seal strongly adhering to the metal or rubber material of the lips of the crack. The plastic-like permanent seal is so strong that it cannot be dislodged by the flow of liquid fluid in the system, and can withstand fluid pressures as high as 40 psi while sealing relatively large cracks and holes, the higher fluid pressure while sealing relatively small pin holes and narrow cracks. As long as the coolant has sealant particles in suspension therein, the particles seek out and seal any new leak that may develop. Furthermore, the fine particles of the ingredients in the composition of the invention have a softening action upon the internal surfaces of the cooling system, thus inhibiting the formation of rust and corrosion. In addition, the circulation pumps are kept properly lubricated by the non-oily lubricating action of the ingredients, such non-oily lubricating action avoiding the formation of an oily film on the internal surface, which is detrimental to heat transfer and which has a deleterious effect on the adhesion qualities of any stop-leak or sealant composition.

The pellets made according to the teachings of the invention dissolve almost immediately in the liquid fluid of internal combustion engine cooling systems or hot water heating systems into very fine particles that do not clog radiator cores or heat exchangers and that remain constantly in suspension in the liquid fluid, as long as such liquid fluid, coolant or heat transfer fluid, is occasionally circulating, thus avoiding the formation of sludge deposits at the lower or stagnant portions of the system. Holes and cracks which are not permanently sealed are detected by examination, in a dimly-lit surrounding, under illumination by a long wave ultraviolet light lamp which causes the water-soluble fluorescent additive to fluoresce, thus clearly showing the location of the leaks and even the shape of the holes and cracks.

Although the sealant and leak detector compositions of the invention are preferably supplied to the user in the form of compacted dry pellets, it is readily apparent that the mixed powders may also be used in bulk in their original particulate form, using an average dosage of about 10 grams of mixed powders per 12 to 16 liters of liquid fluid in the system to be treated for best average results.

Having thus described the invention, what is claimed as new is:

1. A sealant and leak detector composition for use in the cooling system of an internal combustion engine, said composition comprising ginger rhizome flour; ground nut shells, boric acid powder, and a water-soluble fluorescent additive selected from the group consisting of pearlescent nacreous pigments, fluorescent dyes and optical brighteners, whereby unsealed leaks are detectable by examination under ultraviolet light.

2. The sealant and leak detector composition of claim 1 further comprising sodium lignin sulfonate powder.

3. The sealant and leak detector composition of claim 2 further comprising magnesium stearate.

4. The sealant and leak detector composition of claim 3 wherein said ginger rhizome flour and said nut shell powder are finely ground and mixed in proportions of substantially 50 to 75% by weight of said ginger rhizome flour, with an addition of about 1.5 to 3.5% by weight of said boric acid powder, 3 to 6% by weight of said sodium lignin sulfonate powder, 0 to 2% by weight of said magnesium stearate, and 2 to 12% by weight of said water-soluble fluorescent additive.

5. A method of obtaining a sealant and leak detctor composition for the cooling system of an internal combustion engine, said method comprising the steps of: finely grinding nut shells, finely separately grinding ginger rhizomes, thoroughly mixing said ground nut shells and said ground ginger rhizomes with a water-soluble leak detector additive, boric acid and sodium lignin sulfonate powder, wherein said water-soluble leak detector additive is a water-soluble fluorescent material selected from the group consisting of pearlescent nacreous pigments, fluorescent dyes and optical brighteners, whereby unsealed leaks are detected by observation under ultraviolet light.

6. The method of claim 5 further comprising the step of forming dry pellets of said composition by compaction at a pressure of at least 2 tons per square inch (140 kg/cm$^2$).

7. The method of claim 6 further adding magnesium stearate to said composition.

8. The method of claim 5 wherein said nut shells and said ginger rhizomes are ground to a particle size capable of passing through a No. 30 mesh screen and said dry pellets are formed by compaction at a pressure between 20 tons per square inch (1,400 kg/cm$^2$) and 40 tons per square inch (2,800 kg/cm$^2$).

9. The method of claim 7 wherein the proportions by weight of said water-soluble leak detector additive, ginger rhizomes, boric acid powder, sodium lignin sulfonate powder, magnesium stearate and ground hardwood nut shells are respectively 2 to 12%, 50 to 75%, 1.5 to 3.5%, 5 to 6%, 0 to 2% and the balance.

10. A sealant and leak detector composition for a hot water circulation system comprising ginger rhizome flour, ground nut shells, boric acid powder, and a water-soluble fluorescent additive selected from the group consisting of 2,2'-(2.5 thiophenediyl)bis(5-tert-butyl-benzohaxazole), diamino-stilbenedisulfonic acid, cyanuric chloride, naphtotriazolystilbene, 4-methyl-7-dimethylamino coumarin, 4-methyl-7-diethylamino coumarin, benzoflavine, 3,6-dioxyphtalimide, erythrosine, esculin, 4-ethoxyacridone, 3,6-tetramethyldiamino-oxanthone, chromotropic acid, fluorescein, α-naphthylamine, B-naphthylamine, phloxine, salicylic acid, acridine, dichlorofluorescein, 3,6-dioxyxanthone, B-methylesculetin, resorufin, quininic acid, and mixtures thereof.

11. The sealant and leak detector composition of claim 10 further comprising sodium lignin sulfonate powder.

12. The sealant and leak detector composition of claim 11 further comprising magnesium stearate.

13. The sealant and leak detector composition of claim 12 wherein said ginger rhizome flour and said nut shell powder are finely ground and mixed in proportions of substantially 50 to 75% by weight of said ginger rhizome flour, with an addition of about 1.5 to 3.5% by weight of said boric acid powder, 3 to 6% by weight of said sodium lignin sulfonate powder, 0 to 2% by weight of said magnesium stearate, and 2 to 12% by weight of said water-soluble fluorescent additive.

14. A method of obtaining a sealant and leak detector composition for a hot water circulation system, said method comprising the steps of: finely grinding nut shells, finely separately grinding ginger rhizomes, thoroughly mixing said ground nut shells and said ground ginger rhizomes with a water-soluble leak detector additive, boric acid and sodium lignin sulfonate powder, wherein said water-soluble leak detector additive is selected from the group consisting of 2,2'-(2,5 thiophenediyl)bis(5-tert-butyl-benzohaxazole), diamino-stilbenedisulfonic acid, cyanuric chloride, naphtotriazolystilbene, 4-methyl-7-dimethylamino coumarin, 4-methyl-7-diethylamino coumarin, benzoflavine, 3,6-dioxyphthalimide, erythrosine, esculine, 4-ethoxyacridone, 3,6-tetra-methyldiaminooxathone, chromotropic acid, fluorescein, α-naphthylamine, B-naphthylamine, phloxine, salicylic acid, acridine, dichlorofluorescein, 3,6-dioxyanthone, B-methylesculetin, resorufin, quininic acid, and mixture thereof.

15. The method of claim 14 further comprising the step of forming dry pellets of said composition by compaction at a pressure of at least 2 tons per square inch (140 kg/cm$^2$).

16. The method of claim 15 further adding magnesium stearate to said composition.

17. The method of claim 14 wherein said nut shells and said ginger rhizomes are ground to a particle size capable of passing through a No. 30 mesh screen and said dry pellets are formed by compaction at a pressure between 20 tons per square inch (1,4000 kg/cm$^2$) and 40 tons per square inch (2,800 kg/cm$^2$).

18. The method of claim 16 wherein the proportions by weight of said water-soluble leak detector additive, ginger rhizomes, boric acid powder, sodium lignin sulfonate powder, magnesium stearate and ground hardwood nut shells are respectively 2 to 12%, to 50 to 75%, 1.5 to 3.5%, 3 to 6%, 0 to 2% and the balance.

* * * * *